United States Patent [19]
Belka

[11] Patent Number: 4,840,298
[45] Date of Patent: Jun. 20, 1989

[54] BICYCLE LUGGAGE CARRIER ATTACHMENT ARRANGEMENT

[75] Inventor: Heinrich Belka, Bielefeld, Fed. Rep. of Germany

[73] Assignee: Esge-Marby GmbH & Co., KG, Bielefeld, Fed. Rep. of Germany

[21] Appl. No.: 1,687

[22] Filed: Jan. 9, 1987

[30] Foreign Application Priority Data

Jan. 18, 1986 [DE] Fed. Rep. of Germany ....... 3601387

[51] Int. Cl.$^4$ ............................................... B62J 7/00
[52] U.S. Cl. ................................... 224/39; 224/32 A
[58] Field of Search ............... 224/39 R, 30 R, 30 A, 224/31, 40, 41, 32 A; 248/230, 231.3, 231.7, 231.9; 280/289 R, 289 A

[56] References Cited

U.S. PATENT DOCUMENTS

| | | | |
|---|---|---|---|
| 2,135,217 | 11/1938 | Dawsat | 224/39 R |
| 2,531,902 | 11/1950 | Baron | 280/289 A |
| 2,583,550 | 1/1952 | Dennis et al. | 224/39 R |
| 2,809,053 | 10/1957 | Pletscher | 224/39 R |
| 4,191,393 | 3/1980 | Niemann | 280/289 A |
| 4,350,361 | 9/1982 | Fujii | 280/289 A |
| 4,383,625 | 5/1983 | Kiang | 224/39 R |
| 4,596,346 | 6/1986 | Lepage | 224/39 |
| 4,666,071 | 5/1987 | Irwin et al. | 224/39 |
| 4,690,420 | 9/1987 | Belka | 280/289 A |
| 4,711,381 | 12/1987 | Felder | 224/39 |

FOREIGN PATENT DOCUMENTS 430384 6/1926 Fed. Rep. of Germany.
3505692 8/1986 Fed. Rep. of Germany.

OTHER PUBLICATIONS

"Ichrrad technic", (Bicycle Technology), by S. Rauch and F. Winkler, 1980, p. 70, Figs. 142+143, p. 80, Fig. 168, p. 73, Fig. 152, p. 67, Fig. 142.

Primary Examiner—Ernest G. Cusick
Attorney, Agent, or Firm—Frishauf, Holtz, Goodman & Woodward

[57] ABSTRACT

To permit universal attachment of a luggage carrier (2) to a bicycle frame (1), and particularly to a cross element (9, 69) secured to the rear fork (6a, 6b) of the frame, a clamping element (22, 322, 422, 622) is provided for joining the end portion of the luggage carrier to the bicycle frame. The clamping element is formed with an engagement surface (24, 25, 26, 71a) fitting on, matching and engaging a portion of the cross brace (9, 69) with a projection-and-recess fit. The clamping element and the cross brace are attached together, for example by the same screw which can hold a caliper brake. The clamping element is, further, formed with at least one recess (35, 335, 62, 74, 75, 71), shaped and dimensioned to receive at least part of an extending end portion of the luggage carrier and extending essentially at right angles to the rear fork. This end portion may be formed by a cross element (13) or by free ends (411, 412) extending from the luggage carrier. If formed by a cross element, it can be received in an elongated groove in the clamping element, and clamped therein; if formed as projecting end portions, they can be passed through suitable reception openings and retained by set screws.

15 Claims, 5 Drawing Sheets

BICYCLE LUGGAGE CARRIER ATTACHMENT ARRANGEMENT

The present invention relates to bicycle luggage carriers, and more particularly to an arrangement to attach a bicycle luggage carrier to a bicycle frame which is so arranged that the frame of the bicycle and the carrier are not weakened, while permitting attachment of the carrier to a plurality of frames of different designs and dimensions.

BACKGROUND OF THE INVENTION

Bicycle frames have a rear fork. The rear fork elements are connected by a cross brace. The cross brace is positioned at a predetermined distance from the ends of the fork since it also serves as an attachment for a rim or caliper brake which must reach around the rear wheel tire to engage the rim of the rear wheel. This cross brace is formed with a central aperture or hole extending lengthwise of the bicycle to permit attachment of the brake.

Two types of rear bicycle luggage carriers are generally used—see the referenced book "Bicycle Technology" ("Fahrradtechnik") by Rauch and Winkler. In one arrangement, longitudinal support bars or rods of the luggage carrier are flattened at their forward ends—in relation to a position of the bicycle, in which the handlebars are at the front portion. The flattened end is formed with holes through which the seat clamping bolt can be passed when the carrier is to be attached to the bicycle. In another construction, the forward end of the luggage carrier is closed off by a transverse or cross piece which, again, is flattened in its central portion and is formed with holes so that the flattened part can bear against the rear fork elements and screws can be passed through the holes to tighten against a counter plate.

Both constructions have a disadvantage, namely that the deformed end portion of the carrier support rods or bars present structural elements which are weak with respect to the remainder and, particularly under vibration, are subject to breakage, especially at the transition point between the flattened parts and the support braces or rods which are usually round.

The first construction, in which the carrier frame is attached to the seat clamping bolt, requires exact matching of the carrier to the bicycle. Since rear luggage carriers frequently are "add on" elements which are to be universally applicable to various types and sizes of bicycles, the construction requires stocking of numerous luggage carriers, and thus is not suitable for after-market use. Additionally, the spacing between the clamping bolt and seat attachment sleeve clamp varies in different bicycle frames; it is, therefore, difficult or frequently impossible to make a single luggage carrier which is suitable for many different types of bicycles.

The arrangement in which a flattened end portion of the bicycle luggage carrier bears against the frame itself has been found to lead to fissures, usually at the transition between the flattened portion and the remainder of the luggage carrier which, frequently, is made of round wire stock, which fissures eventually result in breakage.

SUMMARY OF THE INVENTION

It is an object to provide an attachment arrangement to connect a luggage carrier to a bicycle frame in which the danger of fracture of the frame is eliminated and, further, which permits attachment of the carrier to any number of different bicycle frames of different manufacture, types and sizes.

Briefly, a clamping element is provided which joins the end portion or portions of the luggage carrier to the frame, the clamping element being formed with an engagement surface to fit on, around or against the cross brace of the bicycle connecting the rear fork elements. The clamping element can be attached to the cross brace by a separate screw or by the same screw which also holds the rear brace, so that the fit of the clamping element on the cross brace provides for an interengaging fit, for example, a projection-and-recess fit. Consequently, the weight of luggage supported on or by the carrier is transferred via the cross brace to the frame. The clamping element is additionally formed with a recess or through-holes, shaped to receive the end portion or end portions or parts thereof of the bicycle luggage carrier. The axis or axes of the recess or of the through-holes, respectively, extend at substantially right angles to the rear fork parts of the bicycle frame, that is, transversely across the rear fork or longitudinally along the frame, respectively. Clamping screws, for example of conical form or set screws, are engaged in the clamping element and, in turn, engage or clamp the extending end portion or portions of the luggage carrier positioned in the recess or passing through the holes of the clamping element.

The use of a clamping element which is a separate attachment element, permits ready matching of any kind of luggage carrier to any kind of bicycle of different size or fork dimension. Additionally, the clamping element does not require weakening of any of the support or structural components, or deformation thereof, which may lead to fissures in the region of the attachment element, and thus at the connection to the bicycle frame.

The interengaging fit between the attachment element and the frame can be obtained, for example, by a groove with tapered surfaces matched to fit against the cross brace of the bicycle; or, if the cross brace of the bicycle is not a circular frame element but, rather, in plate form, the engagement surfaces can be formed in the shape of a slot in the attachment element.

DETAILED DESCRIPTION OF THE PREFERRED EMBODIMENT

Figure 1:
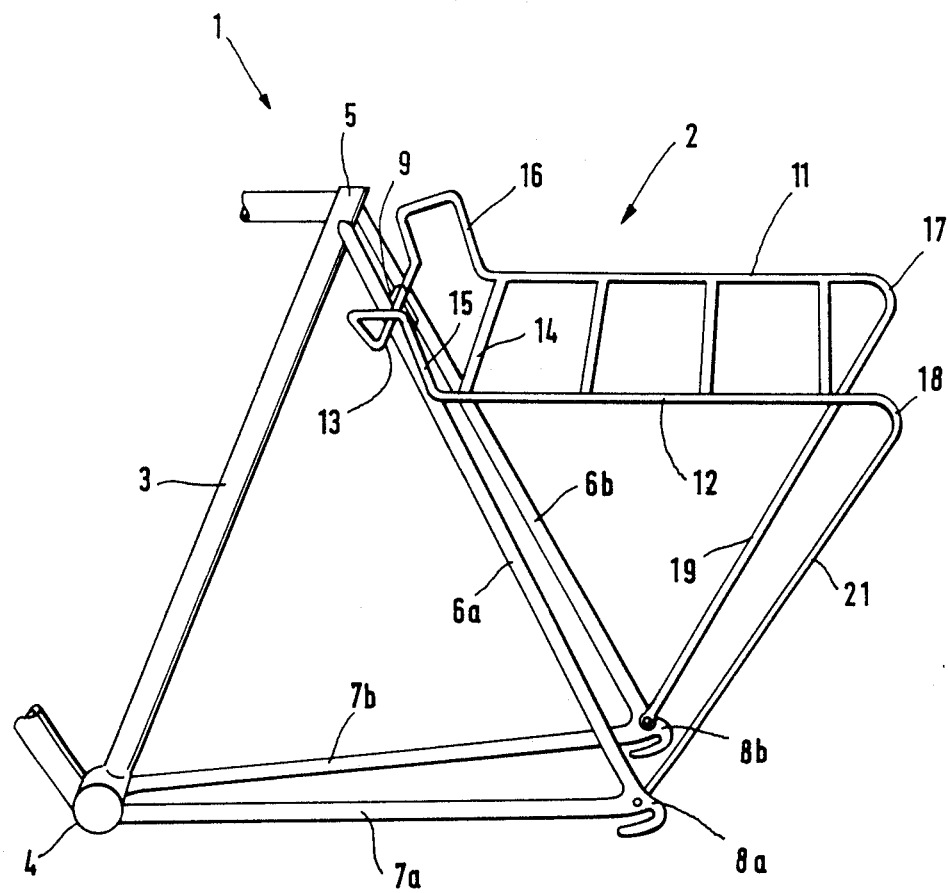
FIG. 1 is a schematic view of the rear portion of a bicycle frame, to which a luggage carrier is attached, to illustrate the general arrangement.

FIG. 1 is a general illustration of the rear portion of a bicycle to which a luggage carrier is attached. The bicycle has a frame 1 to which a luggage carrier 2 is secured. The rear portion of the frame 1 is formed by a saddle tube 3, the lower portion of which is connected to the crank housing 4. The upper end of the seat tube 3 ends in a seat bearing sleeve 5, from which two rear fork elements 6a and 6b extend. The rear fork elements 6a, 6b are connected to horizontal fork elements 7a, 7b which, again, terminate in the vicinity of the crank bearing hub 4. End portions 8a, 8b are formed at the junction between the rear forks 6a, 6b and 7a, 7b, respectively, to receive the shaft of a rear wheel—not shown. This construction is standard.

Figure 2:
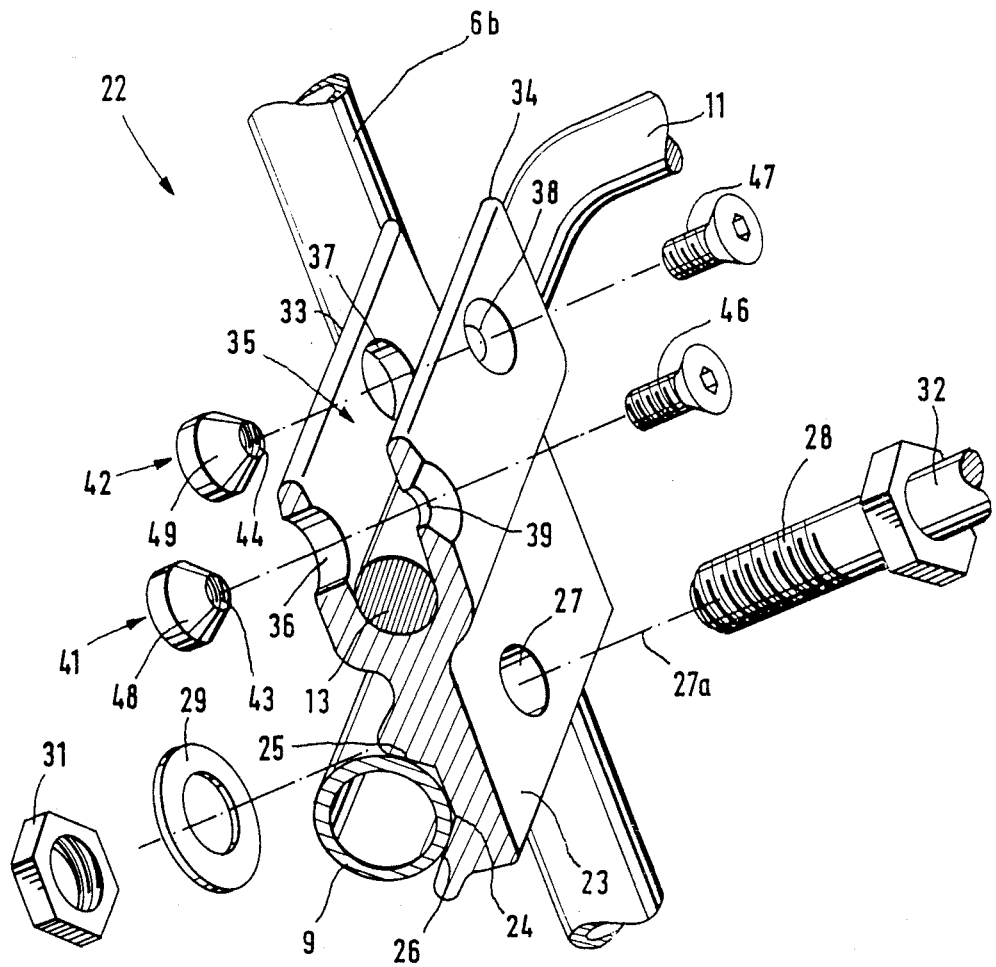
FIG. 2 is a perspective view, partly transversely sectioned, of one embodiment of the invention in which the luggage carrier is formed with a cross connecting element.

A cross brace 9—see also FIG. 2—connects the rear fork elements 6a, 6b. The cross brace 9 is located somewhat below the attachment of the rear fork elements 6a, 6b to the seat tube 3, and at a predetermined distance from the end portions 8a, 8b of the rear fork elements, determined by the diameter of the wheel with which the frame is to be used, and a standard distance thereabove, to permit attachment of a caliper brake to fit around the bicycle wheel tire and the rim of the rear wheel.

The luggage carrier 2 has a luggage support surface defined by a frame formed of two longitudinal rods 11, and 12 connected by cross rods 14. The rods 11 are bent upwardly at 15, 16 to form a support or engagement surface and prevent interference of materials carried on the luggage carrier with operation of the caliper brake (not shown). The support rods 11, 12 are connected by a cross element 13 which, preferably, is unitary with the support elements. The support elements are bent or angled at their rear ends, as shown at 17, 18, and continue in support rods 19, 21, terminating for example in an eye for attachment at a suitable attachment opening formed in the bicycle rear fork end portions 8a, 8b. This construction is standard.

Preferably, the entire luggage carrier parts 19-17-11-16-13-15-12-18-21 are unitary rod or wire elements formed by bending of a large-diameter circular wire, for example made of aluminum. Cross elements 14 are then secured in a suitable manner.

In accordance with the present invention, the cross element 13, unitary with the carrier support rods 11, 12, is secured to the cross brace 9 of the bicycle by a clamping element 22. This permits attachment of the cross element 13 at a region below the seat support sleeve 5, while placing the weight of articles placed on the luggage carrier 11 on the rear fork elements 6a, 6b by weight transfer via the clamping element on the cross brace 9. Preferably, the clamping element 9 is formed of a non-corrosive or only hardly corrosive material, for example aluminum or an aluminum alloy.

The clamping element 22, in accordance with the present invention, is formed as a generally rectangular plate 23 which has a longitudinal dimension parallel to the cross brace 9 such that it fits between the rear fork elements 6a, 6b. At the side adjacent the cross brace 9, plate 23 is formed with a generally trapezoidal groove 24 extending longitudinally and being formed with two straight flank surfaces 25, 26 extending an inclination towards the bottom of the groove 24. The groove 24 extends parallel to and partly fits around and matches the cross brace 9; it surrounds, in part, the cross brace 9 when attached to the bicycle, as seen in FIG. 2.

A cross bore or opening 27 is formed centrally in the plate 23 having an axis 27a passing through the center of the cross brace 9 and matching a hole formed in the cross brace 9 and usually present. Attachment screw 28, which may be the attachment screw of a caliper brake, extends through the opening 27 and the hole in the cross brace 9. The bolt or screw 28 is retained in position by a nut 31, preferably with interposition of a washer 29. A bolt element 32, preferably unitary with the bolt 28, forms the attachment bolt for a caliper brake, as well known, and not shown in the drawing. Bolt 28 and nut 32 are screwed together, so that the clamping element 22, with its essentially rectangular plate, is secured to the cross brace 9, the bolt 28 forming a clamping screw to clamp element 22 against brace 9. The flat side of the plate 22, remote from the cross brace 9, simultaneously forms an engagement surface for the bolt 28 carrying the caliper or equivalent rim brake. Upon tightening of the nut 31, the surfaces 25, 26 will tightly engage and provide an interengaging projection-and-recess fit for the plate 23, the cross brace 9 fitting in the recess defined by the groove 24.

In accordance with a feature of the invention, plate 23 has two upwardly extending leg portions 33, 34, preferably unitary therewith, defining between themselves a groove 25, as best seen in FIG. 2. The groove, defined by the leg portions 33, 34, is generally U-shaped, the base being at the bottom and in the direction of the plate 23. The width of the groove 35 corresponds to the diameter of the cross element 13 of the luggage carrier 2 (see FIG. 1), so that the cross element 13 can be placed in the resulting groove 35—see FIG. 2. The length of the legs 33, 34—in the direction parallel to the cross brace 9—is such that it fits between the two rear fork elements 6a, 6b. Preferably, the length is about the same as that of the plate 23, but it can extend slightly therebeyond, so as to provide at least one bearing surface against the respective fork elements 6a, 6b. By slightly canting the plate 23, prior to attachment, the clamping element 22 can be slipped in position. The groove 35, as seen in FIG. 2, extends transversely, that is, essentially at a right angle to the rear fork elements 6a, 6b. Since the rear fork elements usually convert somewhat, the angle is not exactly a right angle—only substantially so.

The two legs 33, 34 are formed with two throughbores 36, 39 and 37, 38, respectively. The bores are located in pairs, in alignment with each other. The direction of the bores is perpendicular to the axis of the cross element 13 of the luggage carrier 2 and, in general, also parallel to the axis 27a of the opening 27 for bolt 28.

The bores 36 and 37 receive part-cylindrical, part-frustoconical nut elements 41, 42. The nut elements 41, 42 are formed with concentric tapped bores 43, 44. Attachment screws 46, 47, projecting from the rear end of the bicycle, can be screwed into the tapped openings 43, 44 by extending the screws 46, 47 through bores 38, 39. To obtain a smooth uninterrupted surface at the outside of the leg 34, bores 38, 39 are countersunk, and the attachment screws 46, 47 are formed as flat-head or fillet-head screws, preferably with an Allen or Phillips head. Upon tightening of the screws 46, 47, the conical nut elements 43, 44 are drawn inwardly in the direction of the leg 34. The conical surfaces will engage the cross element 13 of the luggage carrier 2. The cylindrical portions 48, 49 remain in the cylindrical bores 36, 37— see FIG. 2. The dimensions of the bores 36, 39 and their spacing from the bottom or base of the groove 35 are so selected that, when the screws 46, 47 are tightened, the conical portions 48, 49 of the nut elements 41, 42 press against the cross element 13 positioned between the legs 33, 34 of the clamping element 22, and tightly engage the cross element 13 against the bottom of the groove 35, while retaining the cylindrical portions 48, 49 of the nut elements in the respective bores 36, 37 and preventing release of the nut elements from the respective bores 36, 37.

The clamping element 22 provides for an interengaging projection-and-recess fit with the bicycle frame by the surfaces 25, 26 and the groove 24 as well as an interengaging fit with the frame of the luggage carrier 2. The interengaging fit with the bicycle frame is effected via the cross brace 9 and the groove 24 in the plate 23. This provides for a projection-and-recess fit and positively transfers forces which engage tangentially to the axis of the opening or bore 27 on the clamping element 22. Bolt 28 provides for tight connection at right angles with respect to such forces which, in general, would be downwardly directed (see FIG. 1).

The interconnection between the cross element 13 and the clamping element 22 likewise is a fitting interengagement, since the cross element 13 is engaged between the two leg portions 33, 34 and, by the nut elements 41, 42, is retained against sliding in longitudinal direction. The groove 35 in the clamping element 22 is open with respect to the top, that is, in direction of the seat attachment 9. Upon loading of the luggage carrier 2, longitudinally acting forces will be transferred to the base of the groove 35, that is, between the legs 33, 34, and is thus directly transferred via plate 23 to and on the cross brace 9 of the bicycle.

Use of an open groove 35 which, in its width, is matched at least approximately to the cross element 13 of the luggage carrier, permits use of a luggage carrier cross brace which is not deformed in any way from the portions 11, 12 thereof, so that no weakening or deformation of material has to occur; the vibrations which are unavoidable in operation of a bicycle thus will not lead to fissures at points of change in cross-sectional shape or weakening of material, and thus long-term reliability and support of articles on the luggage carrier is insured.

Figure 3:
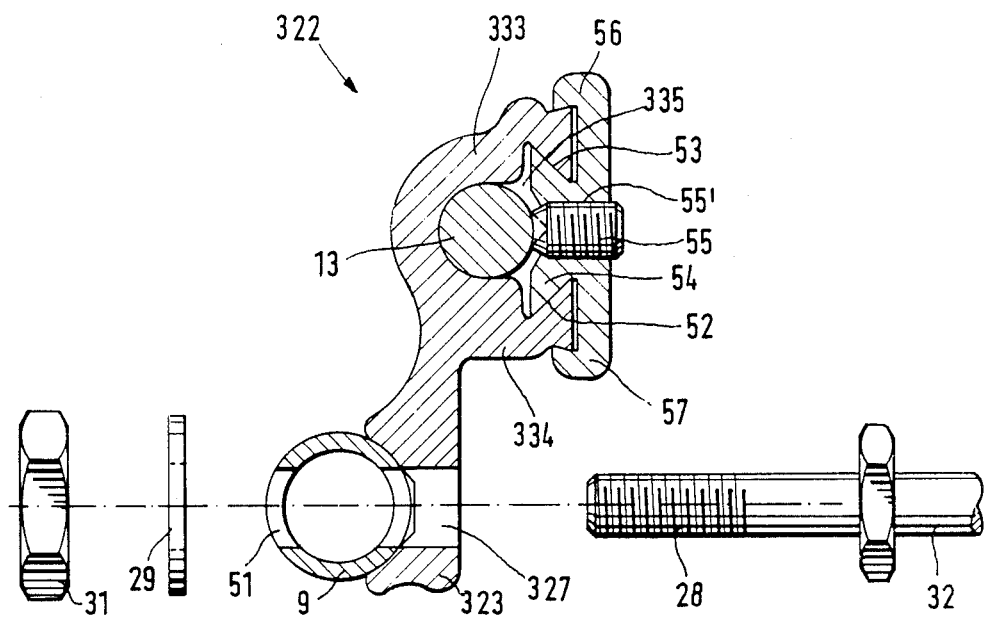
FIG. 3 is a longitudinal sectional view through another embodiment of a clamping element attached to the cross brace of a bicycle.

Embodiment of FIG. 3: The clamping element 322 has a groove 335 for the cross element 13 of the bicycle carrier 2, defined by two legs 333, 334. The opening of the grooves 335 is to the side, for example to the side facing the rear of the bicycle. The attachment to the cross brace 9 of the bicycle is identical to that described in connection with FIG. 2 by attaching an essentially rectangular plate element 323 to the cross brace 9. The screw or bolt 28, again, is guided through an opening 327 in the clamping element 322. The opening or bore in the cross brace 9 is shown at 51.

The cross section of the groove 335, as in FIG. 2, is essentially U-shaped. The two legs 333, 334 are formed with dovetails 52, 53 adjacent their end portions. These dovetails, in the form of longitudinal, essentially triangular grooves, are fitted over an engagement element 54 which, as seen in FIG. 3, interengages with the dovetails 52, 53. The engagement element 54 has a length perpendicular to the plane of the drawings, which corresponds roughly to the width of the clamping element 322. A threaded bore 55' is formed in the engagement element 54 in which a set screw 55 is screwed which locks the cross element 13 in position, secure against longitudinal shifting, as well as fitting against the groove 335.

To prevent spreading of the dovetailed portions or wings of the legs 333, 334, the engagement element 54 is extended with hook-like projections 56, 57, overlapping at its ends the two legs 333, 334. The overlapping ends which, as shown in FIG. 3, may be slightly in-turned and fit over outwardly inclined surfaces formed on the ends of the legs 333, 334, extend preferably essentially over the entire length of the engagement element 54, and hence over the length of the groove 35. Spreading of the legs 333, 334 upon tightening of the screw 55 is effectively prevented by the overlapping end portions 56, 57. The internal thread for the set screw 55 is shown at 55'.

The clamping element 322 in accordance with FIG. 3 likewise clamps the cross element 13 of the luggage carrier 2 by an interengaging form-fitting projection-and-recess engagement between the cross element 13 and the clamping element which, in turn, is fitted by the interengaging connection to the cross brace 9. No reduction in cross section and no deformation of the cross section of the attachment portion of the luggage carrier 2 is needed.

Figure 4:
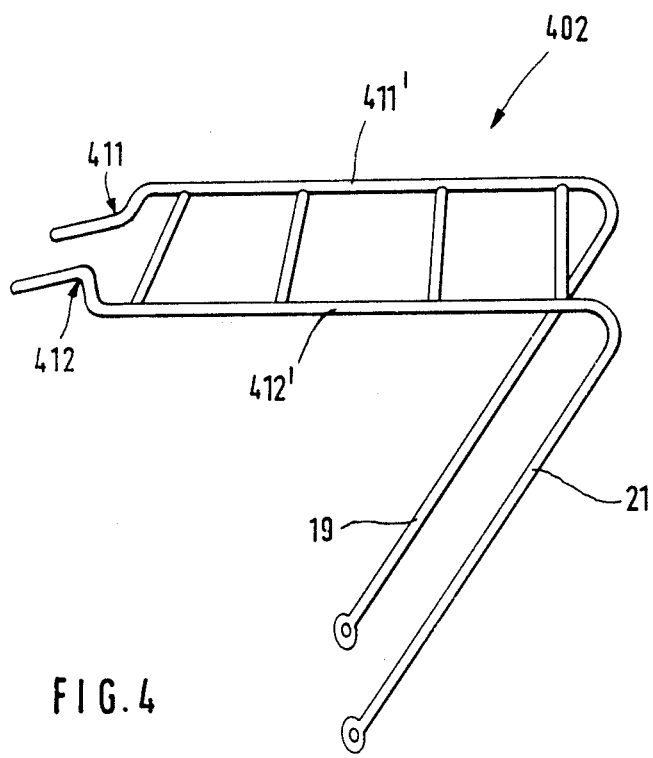
FIG. 4 is a perspective view of a different form of luggage carrier, with which the present invention can be used.

Some luggage carriers do not have a cross element 13. FIG. 4 illustrates, schematically, such a luggage carrier 402 which has longitudinal support rods or bars 411', 412', terminating in projecting end portions 411, 412. They are bent inwardly from the longitudinal portions 411', 412' and terminate in free ends. A luggage carrier of this type can be connected to the frame 1 of the bicycle by various clamping elements, two embodiments of which are shown in FIGS. 5 and 6, for use with different types of bicycle frames, by way of example.

Figure 5:
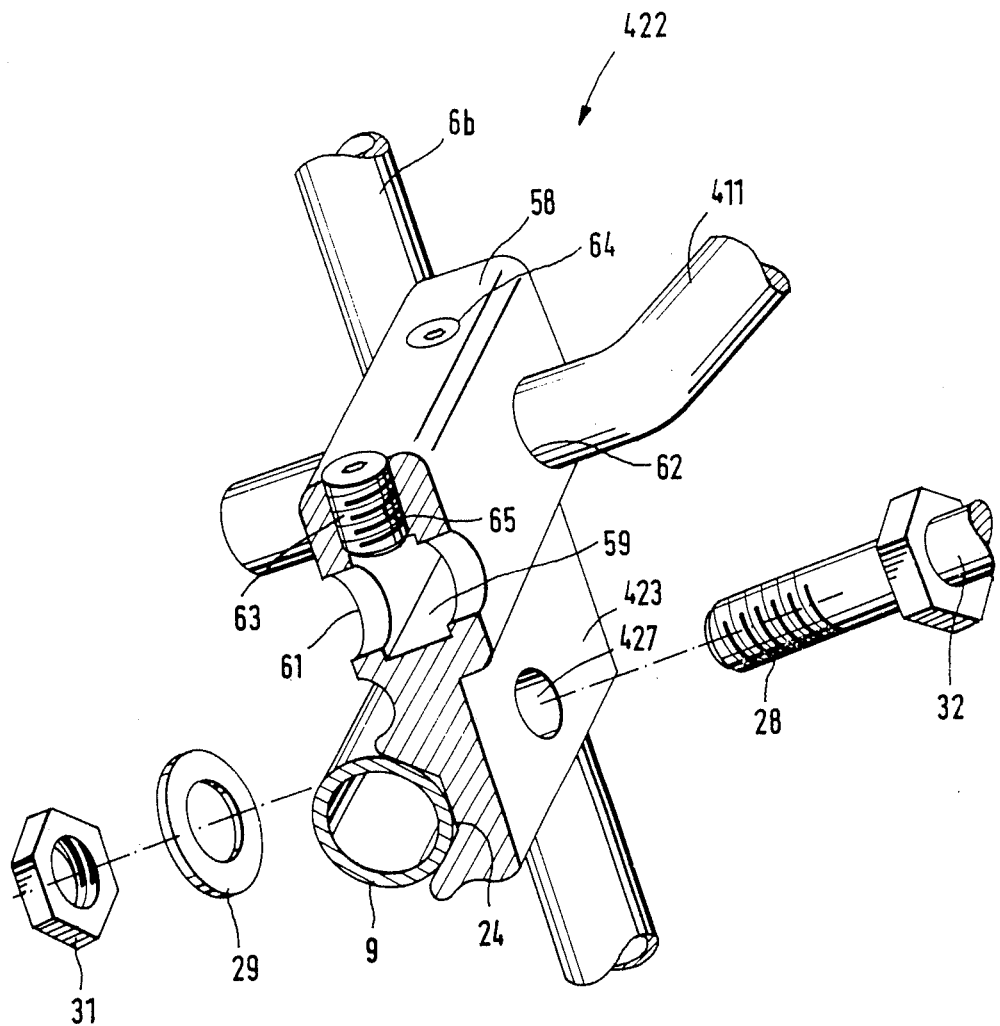
FIG. 5 is a part-perspective, part-exploded and sectional view illustrating a clamping element for the luggage carrier of FIG. 4.
Figure 6:
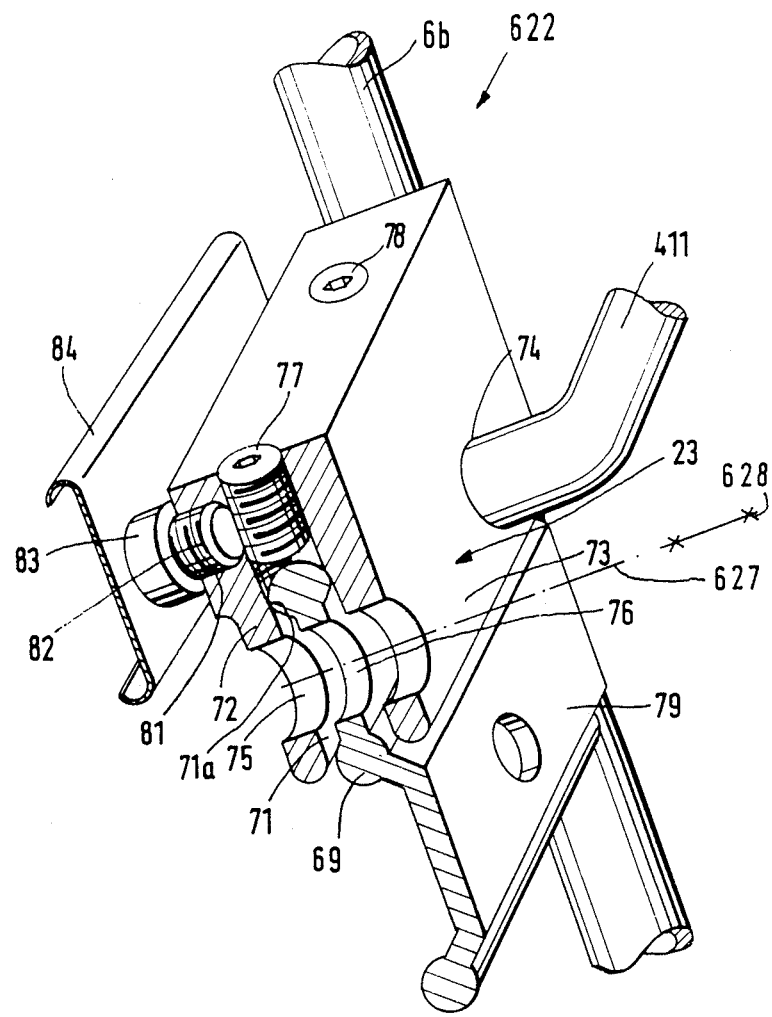
FIG. 6 is a view similar to FIG. 5 and illustrating another form of cross brace element used on a bicycle, and the clamping element therefor.

In accordance with a feature of the invention, an essentially rectangular plate 423—FIG. 5—and corresponding essentially to the plate 23 of FIG. 2, is connected, preferably in unitary manner, to a block 58. Preferably, and to reduce weight, block 58 has a hollow passageway 59 therethrough, extending essentially parallel to the groove 24. The block 58 is somewhat thicker than plate 23 and is formed with two openings in form of through-bores 61, 62 which are spaced from each other by the nominal spacing of the projecting end portions 411, 412 of the carrier 402. The openings 61, 62 are parallel to each other, with their axes at right angles to a plane defined by the plate 423 and extending longitudinally of the frame 9 of the bicycle. FIGS. 5 and 6 show the axes of the bores 61, 62 at right angles to the fork elements 6, 6b and parallel to the longitudinal extent of the frame of the bicycle. The axes of the bores 61, 62 are located in a plane which is parallel to a plane including the axis of the bore 427 for the attachment bolt 28. The cylindrical bores or openings 61, 62 receive the free ends 411, 412 of the luggage carrier 402. The ends 411, 412 are secured in the block 58 by set screws 63, 64 located in suitable tapped bores 65, 66 extending from the upper side of the essentially rectangular block 58 into the interior thereof. The axes of the tapped bores 65, 66 intersect the axis of the associated cylindrical openings 61, 62 so that the set screws 63 and 64 securely clamp the end portions 411, 412 in the associated bore.

In accordance with a feature of the invention, an interengaging form-fitting connection between the clamping element 422 and the cross brace 9 of the bicycle frame is insured; furthermore, an interengaging connection with the longitudinal end portions 411, 412 of the luggage carrier 2 is obtained without any requiring any weakening or handling of the end portions for example by welding to other elements, deformation or the like. The diameter of the openings 61, 62 can readily be matched to the diameter, and the cross section, respectively, of the end portions 411, 412.

The arrangement is particularly suitable for installation of luggage carriers on bicycles since the longitudinal end portions 11, 12 can be shifted in the associated openings 61, 62 to some extent. Thus, subsequent adjustment of the luggage carrier 2 to match a particular bicycle is readily possible. It is easy to match any luggage carrier structure and geometry to different types of bicycle frames.

Some bicycles do not use a tubular cross brace, as shown at 9 in FIGS. 2, 3 and 5 but, rather, use a plate-like cross brace 69, FIG. 6. A bicycle frame of this type can easily be connected by a clamping element in accordance with the present invention. FIG. 6 shows an arrangement, for purposes of illustration, of an attachment or clamping element 622 for a luggage carrier as shown in FIG. 4.

The clamping element 622 is of approximately rectangular block or brick shape. Its lower side is formed with a slot which, in cross section, defines a U-shaped groove or slot 71, defining two parallel, downwardly directed legs 72, 73. The groove or slot 71 of the clamping element 22 is fitted on the plate-like cross element 69 until the essentially plate-like element 69 engages with its upper edge on the base of the slot 71. Usually, bicycle cross elements of such construction have slightly bulbous or part-circular end portions, as shown in FIG. 6. Two essentially parallel bores 74, 75 extend through the clamping element 622 and are in alignment with similar openings formed in the cross brace plate 69. Only bore 76 in the cross brace element is visible in FIG. 6. This bore as well as the bore 75 have a common axis 627.

The bores 74, 75 are matched to the end portions 411, 412 of the carrier—see FIG. 4—which are secured similarly to the embodiment described in detail in connection with FIG. 5. The end portions 411, 412 are locked in position in the clamping element 622 by set screws 77, 78 which are threaded in suitable tapped bores formed in the clamping element 622 and pass through the base of the groove 71. Preferably, the axes of the bores 74, 75 intersect the axes of the associated longitudinal bores 74, 75. Set screws 77, 78, threaded into the block formed by the clamping element 622, engage the upper edge of the plate-like cross element 69, with the tendency to raise the clamping element 622 with respect to the cross element plate 69. Since, however, the longitudinal end portions 411, 412 of the luggage carrier are inserted to fit through the bores of both the clamping element 622 as well as the cross brace plate 69, clamping element 22 will be clamped with respect to the cross brace element 69 and, simultaneously, the end portions 411, 412 of the luggage carrier 402 are clamped to the cross brace element 69.

A portion 79, extending at the bottom of the cross brace element 69, is usually provided to attach a caliper brake thereto.

FIG. 6 illustrates a further feature of the invention which can be used with any one of the embodiments; the forward upper face of the clamping element 622 is formed with two inwardly directed tapped bores, of which only one is seen at 81. The tapped bore 81 receives an attachment screw 82 which holds a C-shaped holder 84 thereon. The holder 84 is provided to retain, for example, a tool box, a battery, or another accessory as desired by the user. The axes of the bores 81 extend at right angles to the bores for the set screws 77, 78, and preferably are offset with respect thereto. Preferably, a spacer washer 83, which may be somewhat elastic, is interposed between the attachment bracket 84 and the block 622.

Various changes and modifications may be made, and features described in connection with any one of the embodiments may be used with any of the others. For example, in order to prevent accumulation of moisture and the like, a plastic cover can be snapped over the respective clamping elements 22, 322, 422, 622, for example by engagement with a slight groove or over a projecting ridge formed at the upper region of the respective clamping element.

Forming a groove, such as the groove 24 (FIG. 2), on the respective clamping element permits attachment on any type of bicycle frame which has an essentially cylindrical cross brace 9. This is the most common construction for bicycles. This arrangement permits acceptance of substantial torques, and unbalances which may be applied to the luggage carrier, for example if a rear pannier is attached to only one side thereof. The clamping element will remain securely seated on the cross brace 9, without twisting or turning and with the axis of groove 35 in an essentially horizontal plane.

The clamping element, with only minor modification, can be equally used with cross braces 69 of essentially plate form, so that the connection can be used also with flat-plate cross elements, also known as Pletscher plates. In accordance with a preferred feature, the clamping element is formed with a cross bore which matches a cross bore in the cross element 69 of the vehicle frame. A suitable attachment screw can secure the clamping element and the plate together.

The clamping element is formed with a flat outer surface. Such a flat outer surface substantially facilitates attachment of a caliper brake, since a large flat engagement surface for the brake bolt or screw 28 is provided. The surface 23, 323, 423 is opposite to the groove receiving the cross brace 9 of the bicycle frame.

Bicycle carriers are frequently made of wire stock of circular cross section, and such that the two longitudinal support portions 11, 12 are connected at the forward end of the bicycle carrier by a cross element 13. For such structures, the embodiments illustrated in connection with FIGS. 2 and 3 are particularly suitable; the respective groove 35, 335 is deeper than at least half the thickness of the wire stock element. This permits placing the cross element securely in the base of the groove and clamping the wire stock element thereagainst. Since the wire stock element, typically, is circular, the angular relationship between the clamping element and the luggage carrier becomes irrelevant, so that wide ranges of attachment geometries are possible, and a given luggage carrier can readily be placed on various types and sizes of bicycles without requiring any deformation of any end portions thereof. The engagement element illustrated in connection with FIG. 3 provides for secure holding of the legs 333, 334 in spite of possible stresses placed thereon by the set screw 55 due to the overlapping ends 56, 57. The set screw 55 securely seats the cross element 13 in the bottom of the groove 335.

The wedge or cone-shaped elements 41, 42 (FIG. 2) permit ready adjustment of the angular relationship of the bicycle carrier 2 with respect to the angle of the clamping element 22 which is matched to the angle of the respective rear fork structure 6a, 6b, of which only 6b is shown in FIG. 2. Thus, again, universal applicability is insured. The conical elements 41, 42 provide for particularly good and secure clamping of the cross element 13, both in longitudinal direction thereof as well as in rotation, once the screws 46, 47 have been tightened, after installation of the bicycle carrier. The manufacture of all parts is simple, and the elements 41, 42 are easily made screw machine components.

The largest force applied to luggage carriers usually is directed on the cross brace 9, 69. Preferably, therefore, grooves which are open upwardly—see FIG. 2—are used since best force transfer is insured thereby. The element of FIG. 3 provides for shifting the engagement of the luggage carrier somewhat rearwardly to extend the rearward ends 17, 18 (FIG. 1) of the luggage carrier if elongated panniers are to be carried.

The arrangements illustrated in connection with FIGS. 5 and 6 have the specific advantage that luggage carriers can be used which are not connected at the forward end or where the forward ends have become damaged or broken and then been cut off. The position of the luggage carrying surface can be readily matched both to the bicycle frame at the attachment ends 8a, 8b (FIG. 1) as well as at the clamping element 422, 622, since the ends 411, 412 can be inserted in the respective openings by different depths, thereby permitting essentially universal adjustment.

FIG. 6 also illustrates the projection-and-recess fit of the bulbous end portion 71a of the cross brace plate 69, which is clamped in position by a clamping screw 628, shown only schematically, and aligned with the axis 627 of the openings 75, 76.

I claim:

1. The combination of
    a bicycle frame (1) with
    a bicycle luggage carrier (2) and with
    an attachment arrangement to attach the bicycle luggage carrier (2) to the frame (1) of the bicycle,
    wherein the bicycle frame has
    a seat tube (3);
    a pair of rear fork elements (6a, 6b) joined to the seat tube (3),
    a cross brace (9, 69) connecting said rear fork elements; and
    wherein the luggage carrier (2) has an extending end portion (11, 12, 15, 16,) positioned for attachment to the frame in the vicinity of the seat tube, said end portion including a cross element (13);
    said attachment arrangement comprising
    a clamping element (22,) located intermediate of the luggage carrier and the bicycle frame and joining the end portion of the luggage carrier (2) to the bicycle frame,
    said clamping element being formed with at least one recess (35; 62; 74, 75) defining a recess axis,
    the clamping element being shaped and dimensioned to receive at least part of the extending end portion (11, 12, 15, 16, 1;) of the luggage carrier,
    the recess axis of the clamping element extending, when the clamping element is associated with a bicycle frame, essentially at right angles to the rear fork elements (6a, 6b) of the frame;
    releasable clamping means (41, 42 55, 63, 64, 78) engaging in said clamping element and positioned on said clamping element, for clamping said at least part of the extending end portion of the luggage carrier in said at least one recess;
    wherein the clamping element (22) comprises a block-like structure formed with receiving holes (36, 37); and
    said at least one recess (35) forming a slot extending transversely across with respect to said rear fork elements (6a, 6b), said slot having a root or bottom;
    the slot and the cross element (13) of the luggage carrier (2) being dimensioned for reception of the cross element in the slot;
    wherein said releasable clamping means comprise clamping elements (41, 42, 46, 47) engageable with the cross element and extending into the receiving holes (36, 37) formed in said block-like structure of the clamping element (22) and engageable with the cross element (13) of the luggage carrier (2); and
    attachment means (28, 32;) for associating and attaching the clamping element to the cross brace (9, 69).

2. The combination of claim 1, wherein the clamping element is formed with a groove (24, 71) extending parallel to the cross brace (9) of the bicycle frame (1), and said cross brace is received in said groove, said groove and cross brace forming a projection-and-recess fit.

3. The combination of claim 2, wherein the clamping element (22,) is formed with a rearwardly facing, with respect to the bicycle frame flat surface to provide a bearing surface for attachment of a bicycle brake;
and wherein said surface is opposite said groove (24).

4. The combination of claim 2, said attachment means is a releasable attachment means (28,) for releasably clamping said clamping element and said cross brace (9, 69) together, with the cross brace being engaged by said projection-and-recess fit with said clamping element, the clamping element defining a recess portion of said projection-and-recess fit.

5. The combination of claim 1, wherein the clamping element includes a generally plate-like surface.

6. The combination of claim 1, wherein the cross brace (9, 69) is formed with a through-bore (51, 76);
    wherein the clamping element (22,) is formed with a through-bore matching the through-bore in the cross brace; and
    wherein the attachment means comprise a clamping screw (28) for clamping the clamping element and the cross brace together.

7. The combination of claim 1, wherein the clamping element (22,) is formed with a rearwardly facing, with respect to the bicycle frame, flat surface to provide a bearing surface for attachment of a bicycle brake.

8. The combination of claim 1, wherein the clamping element is formed with at least one through-bore (36,37); and
    wherein the clamping means comprise conically shaped compression elements (41, 42) fitted into one of said at least one through-bore, and a tension screw (46, 47) fitted into the at least one through-bore, and fitted into said conically shaped elements, the conically shaped elements having their converging portions positioned for engagement with the cross element (13) of the luggage carrier to tighten the cross element against the root or bottom of the slot (35) while permitting relative rotation of the luggage carrier with respect to the clamping element prior to tightening and, hence, angular adjustment of the luggage carrier with respect to the clamping element and hence the bicycle frame.

9. The combination of claim 1, wherein the cross brace (9, 69) is formed with at least one aperture, and a clamping screw passing through the cross brace and the attachment means (22) for securing the cross brace and the attachment means together.

10. The combination of claim 1, wherein said releasable attachment means comprise clamping screws (46) and conically shaped compression elements (41, 42) fitted around said screws (46, 47).

11. The combination of claim 10, wherein said conically shaped elements have their converging portions positioned for engagement with the cross element (13) of the luggage carrier (2) to tighten the cross element against the root or bottom of said slot while permitting relative rotation of the luggage carrier with respect to the clamping element prior to tightening, and hence angular adjustment of the luggage carrier with respect to the clamping element and hence to the bicycle frame.

12. The combination of claim 1, wherein the axis of said at least one recess (35; 62; 74, 75) in the clamping element is in an essentially horizontal plane when said combination is assembled.

13. The combination of
a bicycle frame (1) with
a bicycle luggage carrier (2) and with
an attachment arrangement to attach the bicycle luggage carrier (2) to the frame (1) of the bicycle,
wherein the bicycle frame has
a seat tube (3);
a pair of rear fork elements (6a, 6b) joined to the seat tube (3),
a cross brace (9, 69) connecting said rear fork elements; and
wherein the luggage carrier (2) has an extending end portion (11, 12, 15, 16,) positioned for attachment to the frame in the vicinity of the seat tube and a cross element (13);
said attachment arrangement comprising
a clamping element (22,) located intermediate of the luggage carrier and the bicycle frame and joining the end portion of the luggage carrier (2) to the bicycle frame,
said clamping element being formed with at least one recess (35; 62; 74, 75) defining a recess axis,
the clamping element being shaped and dimensioned to receive at least part of the extending end portion (11, 12, 15, 16, 1;) of the luggage carrier,
the recess axis of the clamping element extending, when the clamping element is associated with a bicycle frame, essentially at right angles with respect to the rear fork elements (6a, 6b) of the frame;
releasable clamping means (41, 42, 55, 63, 64, 78) engaging in said clamping element and positioned on said clamping element, for clamping said at least part of the extending end portion of the luggage carrier in said at least one recess;
wherein the clamping element (22) comprises two parallel legs (33, 34) defining, therebetween, a slot (35), said slot having a base or root;
the slot (35) and the cross element of the luggage carrier being dimensioned for reception of the cross element in the slot, said slot being deeper than at least half the cross section of the cross element (13) with respect to the base or root of the slot (35);
wherein the releasable clamping means comprise clamping elements (41, 42, 46, 47) engageable with the cross element and further engageable with the free ends of the legs (33, 34) of the clamping element and attachment means for associating and attaching the clamping element to the cross brace.

14. The combination of claim 13, wherein (FIG. 2) the legs (33, 34) are formed with matching through-bores (36, 39; 37, 38); and
the clamping means (41, 42, 46, 47) are received in said through-bores for compressing said legs towards each other, and retaining the cross element (13) of the luggage carrier in the base or root of the slot (35).

15. The combination of claim 13, wherein the open end of the slot (35,)is facing away from the position of the cross brace (9).

* * * * *